United States Patent [19]

Porter

[11] Patent Number: 5,211,379
[45] Date of Patent: May 18, 1993

[54] CONTINUOUSLY SELF-COMPENSATING HYDRAULIC POSITIONER

[75] Inventor: Clyde R. Porter, Los Angeles, Calif.

[73] Assignee: P. L. Porter Company, Woodland Hills, Calif.

[21] Appl. No.: 813,292

[22] Filed: Dec. 18, 1991

[51] Int. Cl.⁵ .............................................. F16F 9/10
[52] U.S. Cl. .................................. 267/221; 188/1.11; 188/300; 188/314; 267/64.12; 267/225
[58] Field of Search .................. 267/64.12, 221, 225, 267/226, 182; 188/314, 300, 322.17, 1.11, 319

[56] References Cited

U.S. PATENT DOCUMENTS

| 2,630,887 | 3/1953 | Paquin | 188/300 |
| 3,860,098 | 1/1975 | Porter et al. | 188/300 |
| 4,078,778 | 3/1978 | Hubweber | 188/67 |
| 4,515,034 | 5/1985 | Porter | 74/501 R |

FOREIGN PATENT DOCUMENTS

| 652901 | 11/1962 | Canada | 188/319 |
| 2124275 | 11/1972 | Fed. Rep. of Germany | 188/314 |
| 170165 | 1/1960 | Sweden | 267/226 |

Primary Examiner—George E. A. Halvosa
Attorney, Agent, or Firm—Beehler & Pavitt

[57] ABSTRACT

A hydraulic positioner for seats includes a cylinder and piston structure with a piston rod secured to the piston and extending from the cylinder. A reservoir is provided in the cylinder by a gland jointly biased by a first spring located within the cylinder and a second spring which also urges the piston rod to an extended position. A sleeve is movable by the gland for visual indication of the hydraulic fluid in the cylinder.

6 Claims, 2 Drawing Sheets

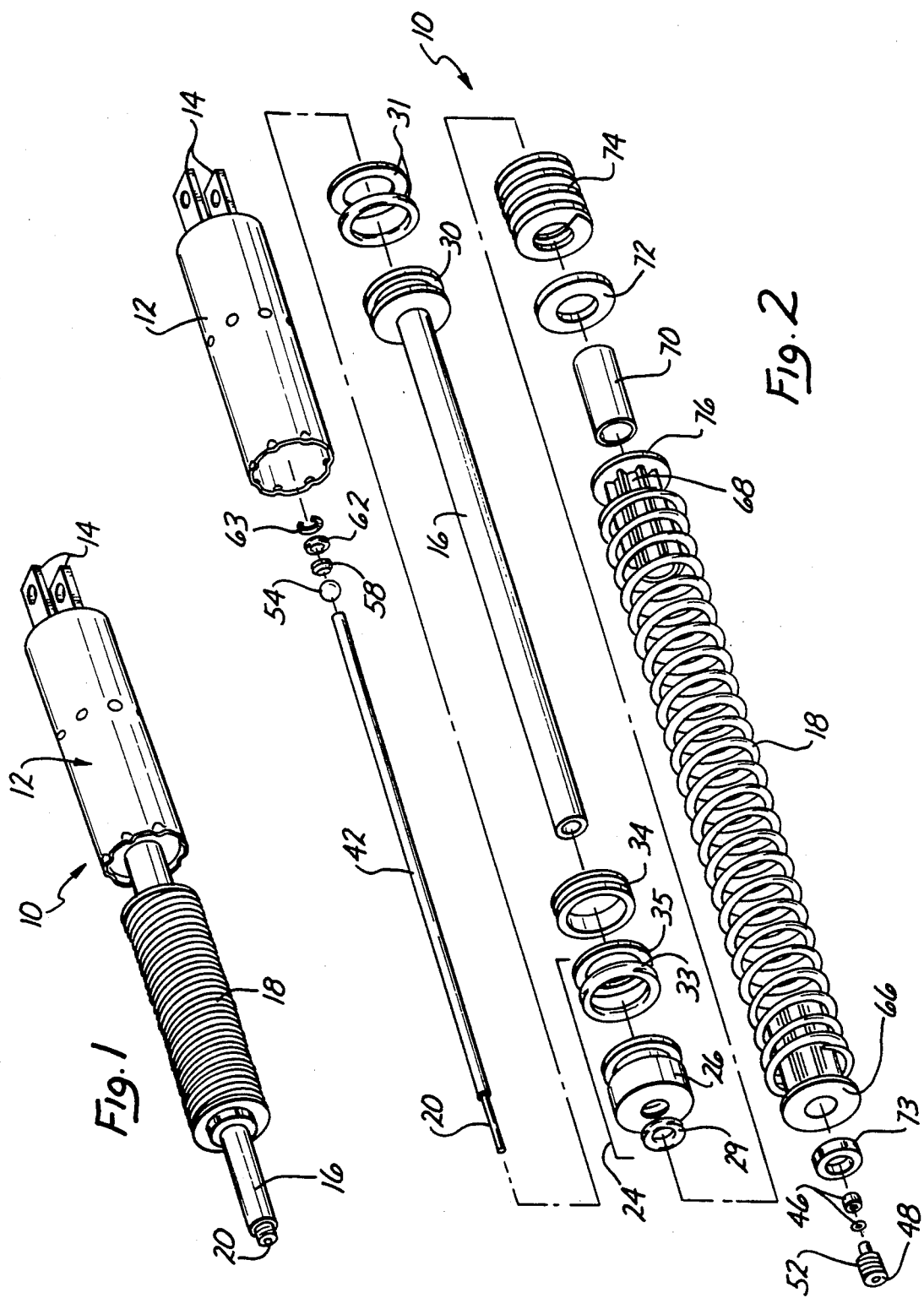

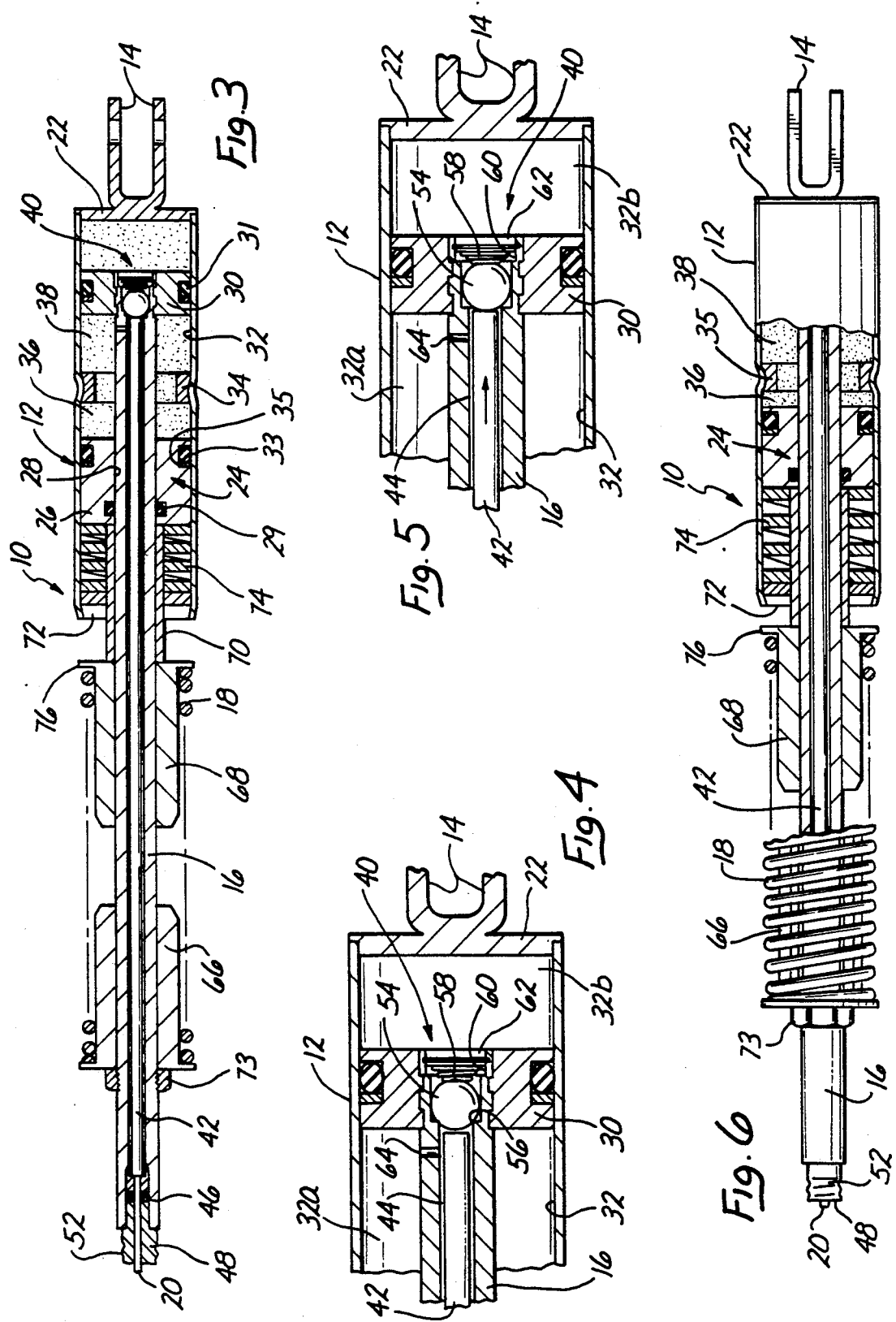

CONTINUOUSLY SELF-COMPENSATING HYDRAULIC POSITIONER

BACKGROUND OF THE INVENTION

1. Field of the Invention

The present invention pertains generally to the field of devices used for adjusting the position of the back rest in a recliner seat and more particularly is directed to an improved hydraulic positioner which is continuously self-compensating for variations in hydraulic fluid volume and visually indicates the amount of hydraulic fluid remaining in a reserve space before servicing or replacement of the unit is required.

2. State of the Prior Art

Hydraulic positioners have long been used in recliner seats where the relative position of the back rest can be fixed at a continuously adjustable angle between an upright and a reclined position. Such devices have found particularly wide application in airline passenger seating. The basic hydraulic positioner of this type has a cylinder with a piston chamber filled with a hydraulic fluid, a piston reciprocable in the chamber, and a piston rod fixed to the piston and extending through one end of the cylinder. The cylinder is fixed to the stationary bottom of the recliner seat, while the free end of the piston rod is fixed to the pivotable back rest of the recliner seat. A valve in the piston allows flow of the hydraulic fluid across the piston, but the valve is normally closed, locking the piston in place relative to the cylinder and fixing the back rest at a given position relative to the stationary bottom of the seat. If readjustment of the back rest position is desired, the valve of the hydraulic positioner is opened by means of a release actuator, such as described in U.S. Pat. No. 4,515,034 issued to this applicant, allowing fluid flow across the piston which is now free to move. After the recliner is brought to the new position, the actuating mechanism is released, returning the valve to its normal, closed position, again locking the back rest of the seat.

Existing hydraulic positioners work well and are used successfully in their intended applications, notably passenger aircraft seating. Wider application of these positioners, for example, to ground transport seating, makes desirable certain improvements. In normal use of the positioner hydraulic fluid is gradually lost over the service life of the device. In certain prior art positioners, a reserve volume of fluid is provided for replenishing the amount lost from a reservoir. An example of a prior art hydraulic positioner is described in U.S. Pat. No. 3,860,098, commonly owned with this application, where a bleed hole under a movable seal is exposed only in full extension of the positioner to replenish the piston chamber with fluid from the reservoir. Full extension occurs when the seat back is brought fully upright. To ensure regular replenishment, the seat backs in airliners are pushed to a fully upright condition between flights as part of an interior "dress-up" routine.

Compensation for thermal expansion and contraction of the hydraulic fluid is specially significant in ground transport applications, where hydraulic positioners may be subject to a very wide thermal range, varying with the local climate and the seasons. Contraction of the hydraulic fluid exposed to cold temperatures can create a vacuum space in the piston chamber which in turn allows a degree of free movement to the piston. Conventional hydraulic locks compensate for this condition when the seat back is brought upright. Failure to do so, however, results in a floppy condition of the seat back with the hydraulic positioner locked. It is also desirable to continously compensate for the change in effective piston chamber volume which occurs as the piston rod moves in and out of the chamber during the stroke of the piston. As the rod is withdrawn, the effective volume of the piston chamber increases by the volume of the rod segment withdrawn from the chamber. This condition can also create a vacuum space in the piston chamber, which unless compensated by replenishment from a reservoir of hydraulic fluid, may likewise creates a floppy condition of the seat back. These characteristics of prior art devices have no significant impact, however, in applications where professional maintenance crews regularly and frequently return the seat backs to a vertical condition, and where the operating temperature range is relatively limited. Owners of private vehicles, on the other hand, cannot be relied upon to return the seat to a fully upright position with any regularity to replenish fluid lost from the piston chamber.

Prior art hydraulic positioners lack an easy indication of the hydraulic fluid remaining in the device. The service life of a given unit ends after the hydraulic fluid in the reservoir is exhausted and an appreciable amount of fluid is lost from the piston chamber. Under these conditions, replenishment no longer occurs, resulting in an increasingly severe flop of the seat back due to the growing void space in the piston chamber. In existing devices maintenance crews receive no advance warning that would enable preventive replacement of the device before performance deteriorates significantly.

The present trend in ground transport applications is to use gas-spring positioners. These devices are low cost, but have poor service life because of leakage of their highly compressed gas charge. Hydraulic positioners offer many advantages over gas-spring devices. However, wider usage of hydraulic positioners in such applications calls for a low cost hydraulic positioner which is continuously self compensating for changes in piston chamber volume due to piston rod movement, for changes in hydraulic fluid volume resulting from thermal expansion/contraction, and for fluid loss over the service life of the device, without having to bring the device to full extension for replenishment of fluid to occur. A further need exists for a hydraulic positioner with external visual indication of the remaining volume of reserve hydraulic fluid to make possible preventive replacement of nearly exhausted units.

SUMMARY OF THE INVENTION

In response to the aforementioned continuing needs, an improved hydraulic positioner is described herein having a cylinder which defines a piston chamber, a piston reciprocable in the piston chamber, one end of the piston chamber being closed by an axially displaceable seal or gland, a piston rod extending through the gland and connected for movement with the piston between an extended and a compressed condition, hydraulic fluid in the piston chamber, and a valve in the piston actuatable for allowing flow of the hydraulic fluid across the piston in the chamber. The valve is normally closed for locking the piston and the rod against movement relative to the cylinder. An exterior return coil spring biases the piston rod to its extended condition. The hydraulic device has a characteristic override force which, when applied in tension to the piston rod relative to the cylinder, operates to force the valve to an open condition by virtue of the pressure transmitted through the piston to the hydraulic fluid which in turn forces the valve open, allowing fluid flow across the piston without actuation of the valve release mechanism. This feature allows maintenance crews to push the seat back to an upright position without pushing a release button on each seat in an airliner.

In a first improvement, a stop element fixed to the cylinder in the piston chamber limits the stroke of the piston and defines a reservoir space between the stop element and the gland from which the piston is excluded. The reservoir is in communication with the piston chamber at all times and for all positions of the piston and piston rod relative to the cylinder. The moveable gland is continuously urged against the hydraulic fluid in the piston chamber by a second spring, which may be mounted internally to the cylinder but outside the fluid chamber. The force of the external return spring is also applied, through a sleeve coaxial with the internal spring, to the gland and is added to the force of the internal spring, both springs thus cooperating in forcing the gland against the hydraulic fluid in the reserve space. The gland can move axially back and forth in the cylinder between the springs and the fluid to compensate a) for thermal expansion or contraction of the hydraulic fluid, b) for loss of hydraulic fluid during the service life of the device, and c) in response to changes in piston chamber volume as the piston rod moves into and out of the chamber.

The force of the internal spring on the gland is preferably greater than the characteristic override force of the hydraulic positioner. This feature prevents formation of a vacuum in the piston chamber as the rod and piston are pulled towards the extended condition with the valve closed, as when the seat back is pushed upright without actuating the release mechanism of the positioner. The relative forces of the internal spring and the valve are selected such that the valve is forced open before the gland moves against the internal spring as the fluid in the piston chamber is pushed against the gland by the moving piston. Opening of the valve allows the piston to move without displacing the gland.

Yet another benefit of this improvement is that the internal spring assists the return spring in extending the positioner when the valve is opened. This happens because the internal spring pressurizes the hydraulic fluid, which pressure acts on the piston when the valve is open to drive the piston and the piston rod towards extension, in cooperation with the return spring.

In a second improvement, an indicator element exterior to the cylinder is movable with the gland. The spacing between the indicator element and one end of the cylinder provides at-a-glance visual indication of the spacing between the gland and the stop element, which is directly representative of the amount of reserve fluid remaining in the cylinder.

These improvements are advantageous in all current applications of hydraulic positioners, and in particular make the devices better suited to automotive and other similar applications where the unit must be continuously self-compensating without regular attention by maintenance personnel through a wide range of operating conditions. These advantages are achieved in a simple, low cost hydraulic positioner which can advantageously compete with gas spring positioners now in use in automotive application. Gas spring devices have a relative poor service life as the highly compressed gas charge is lost through leakage.

These and other advantages of the present invention will be better understood by reference to the following detailed description of the preferred embodiments, taken together with the attached drawings.

BRIEF DESCRIPTION OF THE DRAWINGS

FIG. 1 is perspective view of a hydraulic positioner improved according to this invention;

FIG. 2 is an axially exploded perspective view of the hydraulic positioner of FIG. 1;

FIG. 3 is a longitudinal section of the hydraulic positioner of FIG. 1;

FIG. 4 is an enlarged fragmentary view of the ball seat valve, shown in its normal closed condition, of the hydraulic positioner of FIG. 3;

FIG. 5 is a view as in FIG. 4 showing the ball seat valve actuated to its open condition;

FIG. 6 is a longitudinal view of the hydraulic positioner of FIG. 1 shown partly in section and illustrating a relatively depleted condition of the hydraulic fluid reservoir, indicated by a reduced gap between the indicator flange and the cylinder end.

DESCRIPTION OF THE PREFERRED EMBODIMENT

With reference to the drawings, FIG. 1 shows the hydraulic positioner 10 of this invention, which includes a cylinder 12, a piston rod 16, and a return spring 18. Mounting tabs 14 at the free end of the cylinder are fastened to a movable part of the recliner seat while the free end of the rod 16 is fastened to a stationary part of the seat by suitable mounting hardware. The use of such positioners in recliner seats is known and need not be described here.

Turning to FIG. 3, the cylinder 12 has a fluid tight closed end 22, to which is welded a U shape element defining two mounting tabs 14, which are perforated for receiving a suitable mounting fastener. A seal or gland 24 includes a gland body 26 with an axial bore 28 sized for making a close fit with the outer diameter of the piston rod 16. The gland body 26 is internally and externally grooved for receiving respectively an internal ring seal 29 and two outer seal rings 33, 35, for respectively making a fluid tight seal between the gland body 26 and the piston rod 16, and between the gland body 26 and the wall of cylinder 12. The gland 24 is axially displaceable both relative to the piston rod 16 and the wall of cylinder 12 while maintaining a fluid tight seal with both elements. A piston 30 with piston ring seals 31 is fixed to the inner end of the piston rod 16 and is reciprocable with the rod in a piston chamber 32. A stop ring 34 is swaged to the cylinder 12 in the chamber 32 between the piston 30 and the gland 24 to define a reservoir 36. The ring 34 excludes the piston 30 from the reservoir 36 but is open to permit continuous communication and free flow of hydraulic fluid 38 between the piston chamber 32 and reservoir 36. The piston 30 includes a valve assembly generally indicated by numeral 40, which controls the flow of hydraulic fluid from one side of the piston 30 to the other in the piston chamber 32. The valve 40 is normally closed to prevent flow of hydraulic fluid between the two sides 32a and 32b of the piston chamber, thus locking the piston 30 and piston rod 16 at some selected arbitrary position in the cylinder 12.

Operation of the valve 40 will now be explained with reference to FIGS. 4 and 5. The piston rod 16 is a hollow tube which carries in its interior a push rod 42 with an end section 20 of smaller diameter. The tip of the end section 20 projects from the free end of the piston rod. The diameter of the push rod 42 is substantially smaller than the inside diameter of the piston rod 16 so as to define an interior cylindrical space 44, which is closed near the free end of the piston rod 16 by a compound seal 46. A threaded end piece 48 fitted on the free end of the piston rod 16 has outer groves 52 on which can be mounted an actuating device (not shown) for pushing the projecting tip 20 of the push rod into the piston rod, towards the right in FIGS. 3-5. This actuation of the push rod 42 operates to open the valve 40. The ball valve 40 includes a ball 54 normally urged onto a valve seat 56 by a spring 58 supported in an axial port 60 on a ring 62 secured by expansion ring 63. The axial port 60 is open to allow flow of fluid from side 32b of the piston chamber into the interior cylindrical space 44 of the piston rod. A radial port 64 in the piston rod communicates the space 44 with side 32a of the piston chamber 32. Communication through port 64, space 44, and port 60 is normally closed by the ball 54 on the ball seat 56, a condition illustrated in FIG. 4.

When the push rod 42 is actuated, the inner end of the push rod 42 unseats the ball 54 from the ball seat 56 against the spring 58, as shown in FIG. 5. Displacement of the ball 54 away from the ball seat opens the valve 40 for fluidic communication between sides 32a and 32b of the piston chamber 32. The piston 30 can now move axially along the cylinder 12, between the stop ring 34 and the cylinder end 22.

The piston rod 16 is biased to an extended condition relative to cylinder 12 by the external return spring 18. The coil spring 18 is mounted between two end support fittings 66 and 68. Support fitting 66 is axially fixed against a nut 73 by the force of spring 18, while the other support fitting 68 is forced by spring 18 against a sleeve 70 which passes through a center hole in an end closure 72 of the cylinder 12, and bears against the gland 24, pressing the gland against the hydraulic fluid filling the reservoir 36. An internal coil spring 74 is compressed between the end closure 72 and the gland 24, in the radial space between sleeve 70 and the cylinder 12. The internal spring also presses the gland 24 against the hydraulic fluid in reservoir 36. The forces of the external return spring 18 and the internal spring 74 are therefore combined against the gland 24, urging the gland towards the stop ring 34. In an initial condition of the device, where a reserve supply of hydraulic fluid is contained in a reserve space 36, the gland 24 is held against movement towards the stop ring 34 by the substantially incompressible hydraulic fluid 38. The gland 24 responds to thermal expansion and contraction of the hydraulic fluid by corresponding axial displacement away from or towards the stop ring 34, enlarging and diminishing respectively the combined volume of the reserve space 36 and piston chamber 32 as the hydraulic fluid in both spaces expands and contracts with temperature variations. Likewise, as hydraulic fluid 38 is slowly lost over the service life of the positioner 10, the gland 24 moves towards the stop ring 34, compensating for such loss of fluid and preventing formation of a void space in the piston chamber 32. Finally, the movable gland 24 also compensates for variations in effective volume of the piston chamber 32 as the piston rod 16 moves with the piston 30 between the stop ring 34 and the end closure 22. As the piston rod enters the piston chamber, the volume of the piston rod displaces an equal volume of hydraulic fluid 38 from the chamber 32 and into the reserve space 36. The reservoir 36 is correspondingly enlarged by displacement of the gland 24 away from the stop ring 34. The converse process occurs as the piston rod is withdrawn from the piston chamber 32, resulting in the gland 24 moving towards the stop ring 34 under the combined force of springs 18 and 74.

From the foregoing, it will be appreciated that the hydraulic positioner 10 is continuously self-compensating for thermal expansion/contraction of hydraulic fluid 38, for leakage of fluid 38 from the piston chamber 32, and for changes in piston chamber volume due to movement of the piston rod 16. This compensation occurs as a result of exchange of hydraulic fluid between the reservoir 36 and the piston chamber 32, which are in fluidic communication with each other for any relative position of the piston 30 in the piston chamber 32, under the urging of springs 18 and 74 acting on movable gland 24..

The force of internal spring 74 drives fluid in side 32a of the piston chamber towards side 32b when the valve 40 is open. This has the effect of pressurizing side 32b and driving the piston 30 towards the left in the drawings, thereby extending the piston rod 16 from the cylinder 12. This action of the internal spring 74 assists the action of the external return spring 18 to oppose a load tending to compress the positioner 10 and drive the rod 16 into the cylinder 12.

The piston rod 16 can be released for movement between a compressed condition where the piston rod 16 is retracted into the cylinder 12, and an extended condition of the rod 16, by actuating the push rod 42 which opens the valve 40, as explained above. It is also desirable however, to allow the positioner 10 to be returned to an extended condition in a recliner seat by simply pushing up on the seat back to a vertical position. This feature is a convenience in the dress-up of aircraft interiors, for example, where the crew moves down the iles and pushes the seat backs upright without having to push the release button for each seat. Positioner 10 has characteristic override force above which the ball 54 against the spring 58 with sufficient force to open the valve 40, allowing the piston rod to extend without opening valve 40 if sufficient tensile force, the characteristic override force, is applied to the positioner 10. Since valve 40 is initially closed, the tensile force is transmitted by piston 30 and the fluid 38, pushing the gland 24 against the internal spring 74. Spring 74 is selected to apply a force on gland 24 which is greater than the characteristic override force of the positioner 10. This prevents the override force from pushing the gland 24 and compressing spring 74 before the valve 40 opens, and creating a vacuum in space 32b of the piston chamber 32.

The relative position of the gland 24, and in particular the spacing between the gland 24 and stop ring 34 is indicated by the spacing between the end flange 76 of the movable end support 68 and the end 72 of the cylinder 12. As the gland 24 approaches the stop ring 34 due to loss of hydraulic fluid 38, the end support 68 and sleeve 70 also move with the gland 24 under the urging of return spring 18. The end flange 76 thus approaches the cylinder end 72 as the hydraulic fluid in reservoir 36 is depleted, and provides visual indication of the amount of reserve fluid remaining in the unit, which in turn is indicative of the remaining service life of hydraulic positioner 10. FIG. 6 shows a relatively depleted condition of the fluid in reservoir 36 with consequent displacement of the gland 24 towards the stop ring 34, which displacement is indicated by the reduced gap between indicator flange 76 and cylinder end 72.

While a particular embodiment of the invention has been described and illustrated for purposes of clarity and example, it must be understood that many changes, substitutions and modifications to the described embodiment will be obvious to those possessed of ordinary skill in the art without thereby departing from the scope and spirit of the invention, which is defined by the following claims

What is claimed is:

1. A hydraulic positioner comprising a cylinder, a piston chamber in said cylinder closed at one end by an axially displaceable gland, a piston axially reciprocable in said piston chamber, a rod axially connected to said piston and slidable through said gland, said rod moveable with said piston between an extended and a compressed condition, hydraulic fluid in said piston chamber, valve means in said piston actuatable for allowing flow of said fluid across said piston, said valve means being normally closed for locking said piston and said rod against movement in said cylinder, a first spring urging said rod to said extended condition, and a second spring cooperating with said first spring means for jointly urging said gland against said fluid to compensate for changes in fluid volume in said chamber.

2. The positioner of claim 1 further comprising stop means between said gland and said piston for limiting the stroke of said piston thereby to define a reservoir of said hydraulic fluid open to said piston chamber, and indicator means exterior to said cylinder for visually indicating the axial spacing between said gland and said stop means.

3. The positioner of claim 1 wherein said valve means are spring biased to said normally closed condition, and said valve means can be driven to an open condition by an external override force applied to said piston rod, said positioner characterized in that said second spring acts on said gland with a force greater than said override force.

4. The positioner of claim 1 further comprising spring support means slidable on said rod and urged by said first spring for movement with said gland, the position of said spring support means relative to said cylinder being indicative of the fluid remaining in said reservoir.

5. A hydraulic positioner comprising a cylinder closed at one end, an axially displaceable gland closing an opposite end of a fluid filled chamber in said cylinder, a piston axially reciprocable in said chamber, a rod axially connected to said piston and slidable through said gland, said rod moveable with said piston between an extended and a compressed condition, valve means in said piston actuatable externally to said cylinder for allowing flow of said fluid across said piston, said valve means being normally closed for locking said piston and said rod against movement in said cylinder, a return spring urging said rod to said extended condition, and internal spring means in said cylinder cooperating with said return spring for jointly urging said gland against said fluid thereby to compensate for changes in volume of said chamber as said rod moves in and out of said chamber and changes in fluid volume caused by leakage or temperature changes;

stop means between said gland and said piston for limiting the stroke of said piston thereby to divide said chamber into a piston chamber and a reservoir open to each other, and indicator means on said rod external to said cylinder and movable with said gland, the position of said indicator means relative to said cylinder being representative of the amount of fluid in said reservoir.

6. A hydraulic positioner comprising a cylinder, a piston chamber in said cylinder closed at one end by an axially displaceable gland, a piston axially reciprocable in said piston chamber, a rod axially connected to said piston and slidable through said gland, said rod moveable with said piston between an extended and a compressed condition, hydraulic fluid in said piston chamber, valve means in said piston actuatable for allowing flow of said fluid across said piston, said valve means being normally closed for locking said piston and said rod against movement in said cylinder, wherein said valve means are spring biased to said normally closed condition and said valve means can be driven to an open condition by an external override force applied to said piston rod, a first spring urging said rod to said extended condition, and a second spring cooperating with said first spring for jointly urging said gland against said fluid to compensate for changes in fluid volume in said chamber, said positioner characterized in that said second spring acts on said gland with a force greater than said override force.

* * * * *